L. F. Buschmann,
Fluid Meter.
No. 111,040. Patented Jan. 17, 1871.
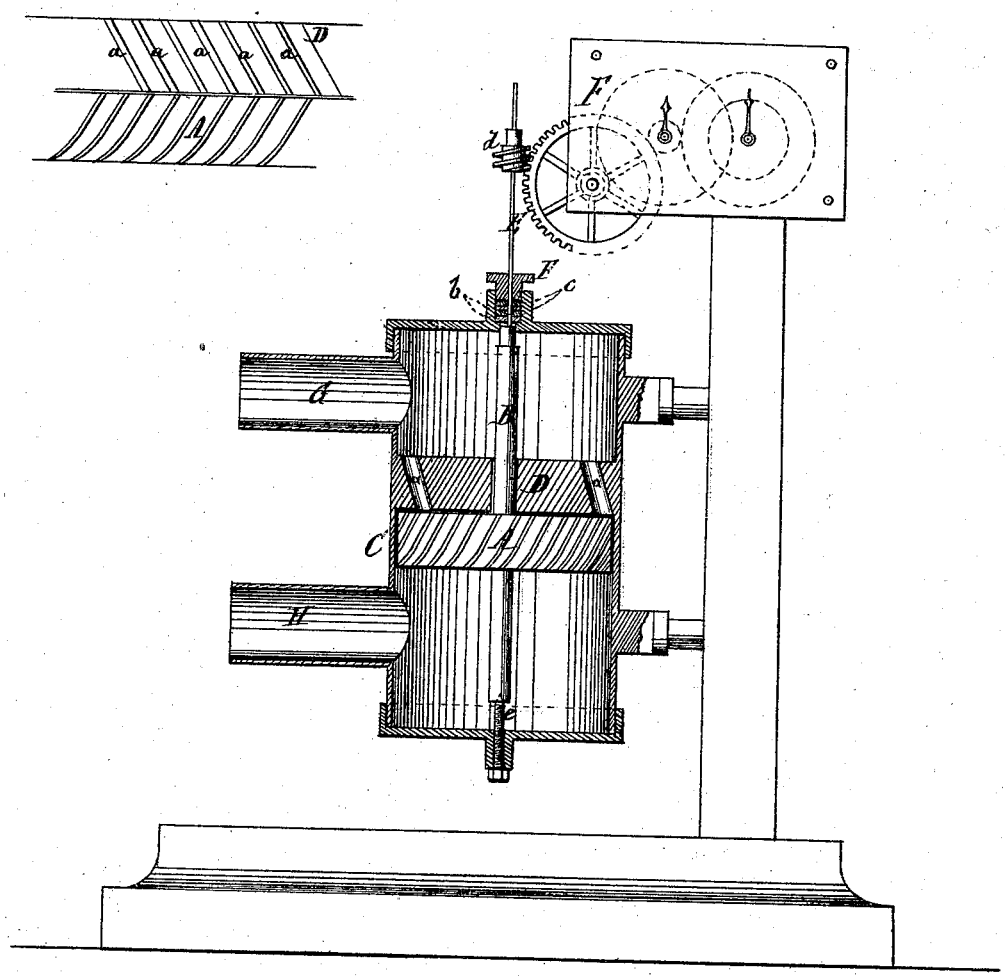

United States Patent Office.

LEOPOLD F. BUSCHMANN, OF NEW YORK, N. Y.

Letters Patent No. 111,040, dated January 17, 1871.

IMPROVEMENT IN FLUID-METERS.

The Schedule referred to in these Letters Patent and making part of the same.

*To all whom it may concern:*

Be it known that I, LEOPOLD F. BUSCHMANN, of the city, county, and State of New York, have invented a new and improved Fluid-Meter; and I do hereby declare the following to be a full, clear, and exact description thereof, which will enable those skilled in the art to make and use the same, reference being had to the accompanying drawing forming part of this specification, in which drawing—

Figure 1 represents a vertical central section of this invention.

Figure 2 is a horizontal section of the same.

Figure 3 is a diagram illustrating the relative positions of the stationary channels and of the movable buckets of the wheel.

Similar letters indicate corresponding parts.

This invention relates to a fluid-meter provided with a bucket-wheel mounted on a vertical spindle, the fluid being conducted to the buckets of the wheel through a series of contracted openings in a stationary disk, in combination with a registering mechanism, to which the motion of the bucket-wheel is transmitted by an endless screw mounted on a prolongation of the vertical spindle in such a manner that, by the contracted openings in the stationary disk, a very small quantity of liquid passing through the meter is capable of imparting motion to the bucket-wheel, and a fluid-meter is obtained which is exceedingly simple in its construction, and capable of indicating correctly all the fluid passing through it.

The prolongation of the spindle of the bucket-wheel passes through a stuffing-box containing alternating disks of India rubber and of metal, so that said prolongation is packed tight with the least possible friction.

In the drawing—

The letter A designates a bucket-wheel, which is mounted on a vertical spindle, B, and surrounded by a jacket, C, fitting closely to the circumference of the wheel.

Over the wheel is situated a disk, D, which is firmly secured by the inner circumference of the jacket C, and which is perforated with a series of openings or channels, $a$, running in oblique directions, as shown in fig. 3, so that the liquid passing down through the same will strike the buckets of the wheel A at right angles or nearly so.

The channels $a$ are bored out round or they are contracted in such a manner that, in case a limited quantity of liquid passes through the meter, the liquid passing down through each of the channels is prevented from spreading, and thus enabled to exert a certain impact on the buckets, and that the wheel A is caused to revolve by a very small quantity of liquid acting on it.

From the upper end of the spindle B rises an extension, E, made of thin steel wire, so as to produce the least possible friction in the stuffing-box F, and the friction is reduced to a minimum by the packing which I employ in said stuffing-box.

This packing consists of two disks, $b$, of India rubber, which alternate with disks $c$, of metal, as shown in fig. 1 of the drawing.

On the upper end of the extension E is mounted a worm-screw, $d$, which transmits the motion of the bucket-wheel A to the registering mechanism F.

The bottom end of the spindle B runs on a pointed screw $e$.

The liquid to be measured is admitted through a pipe, G, and it discharges through a pipe, H, (see fig. 1.)

By these means a liquid-meter is obtained capable of recording the correct quantity of any liquid flowing through it, independent of the head or velocity with which the liquid passes through the same, the meter being so constructed that it is capable of measuring a very small quantity of liquid as accurately as a large quantity.

What I claim as new, and desire to secure by Letters Patent, is—

The arrangement of a stationary disk, D, perforated with oblique contracted channels $a$, and fitting closely into the jacket C, over the bucket-wheel A, mounted on a vertical spindle, B, the extension of which carries a worm-screw to transmit the motion of the bucket-wheel A to the registering apparatus, all as herein shown and described.

This specification signed by me this 7th day of October, 1870.

L. F. BUSCHMANN.

Witnesses:
W. HAUFF,
E. F. KASTENHUBER.